United States Patent [19]
Rappen

[11] Patent Number: 5,114,000
[45] Date of Patent: May 19, 1992

[54] STRIPPING DEVICE FOR CLEANING CONVEYOR BELTS

[75] Inventor: Albert Rappen, Mülheim an der Ruhr, Fed. Rep. of Germany

[73] Assignee: VSR Engineering GmbH, Mülheim an der Ruhr, Fed. Rep. of Germany

[21] Appl. No.: 580,268

[22] Filed: Sep. 7, 1990

[30] Foreign Application Priority Data

Sep. 9, 1989 [DE] Fed. Rep. of Germany ....... 3930204

[51] Int. Cl.⁵ .............................................. B65G 45/16
[52] U.S. Cl. ................................... 198/499; 198/497
[58] Field of Search ............................. 198/497, 499

[56] References Cited

U.S. PATENT DOCUMENTS

| 3,994,388 | 11/1976 | Reiter | 198/499 |
| 4,036,354 | 7/1977 | Reiter | 198/499 |
| 4,768,644 | 9/1988 | Cromm | 198/499 |
| 4,838,409 | 6/1989 | Rappen | 198/497 |
| 4,887,329 | 12/1989 | Perneczky | 198/499 X |

FOREIGN PATENT DOCUMENTS

| 0328171 | 8/1989 | European Pat. Off. | 198/499 |
| 1037363 | 8/1958 | Fed. Rep. of Germany | 198/499 |
| 3742583 | 5/1989 | Fed. Rep. of Germany | 198/499 |
| 0215416 | 9/1987 | Japan | 198/499 |
| 0282017 | 11/1988 | Japan | 198/499 |
| 2042454 | 9/1980 | United Kingdom | 198/499 |

Primary Examiner—Robert P. Olszewski
Assistant Examiner—James R. Bidwell
Attorney, Agent, or Firm—McGlew & Tuttle

[57] ABSTRACT

Stripping device for cleaning conveyer belts, with a bearing axis for stripping arm that can be mounted on it by holding brackets. An axis-parallel pivot axis for the corresponding stripping arm is arranged above the bearing axis. The stripping arm is also supported against the bearing axis or holding bracket by a spring member. As a result, the stripping arm or its scraping blade is always pressed properly against the conveyer belt to be cleaned, and optimal as well as low-wear cleaning effect is achieved.

17 Claims, 3 Drawing Sheets

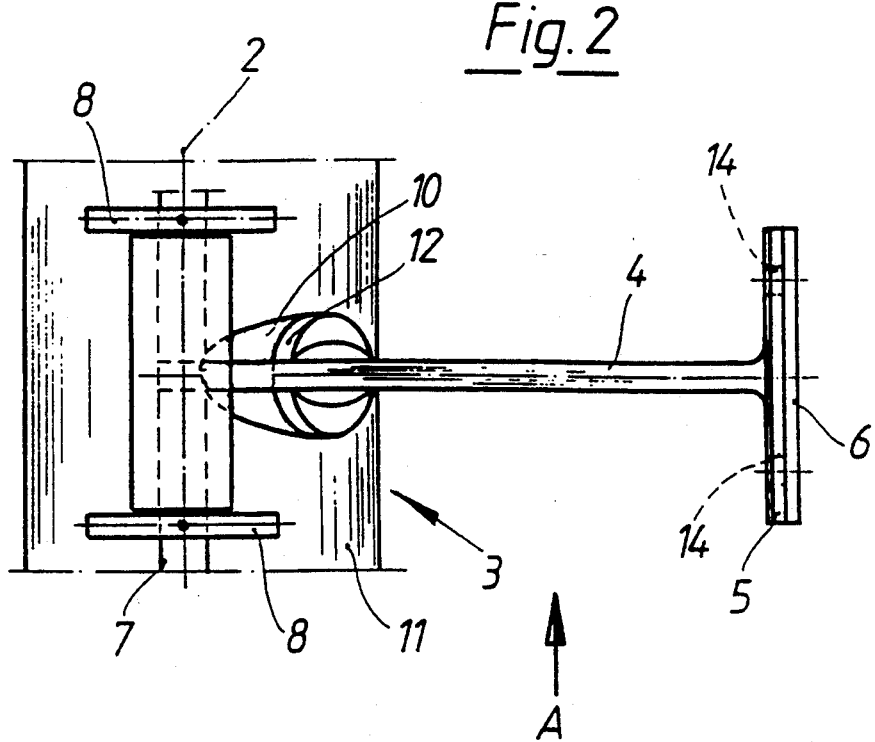
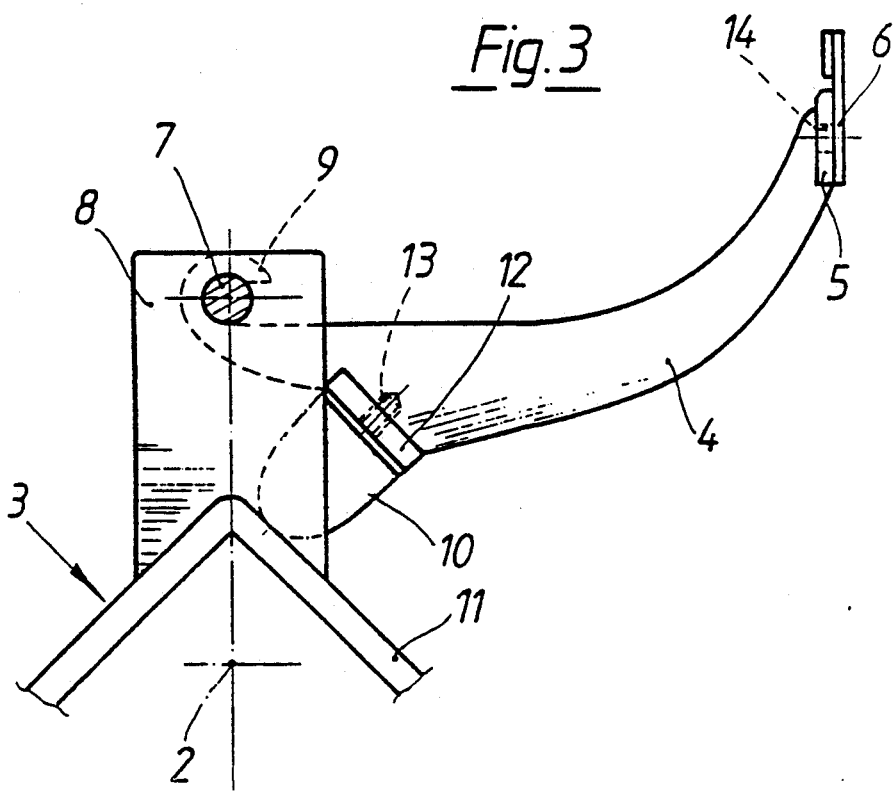

STRIPPING DEVICE FOR CLEANING CONVEYOR BELTS

FIELD OF THE INVENTION

The present invention pertains to a stripping device for cleaning conveyer belts with a bearing axis arranged under the respective conveyer belt and along the width of the belt. Stripping arms can be mounted on the stripping device by means of holding brackets, with scraping blade holders at the ends of the stripping arms for a scraping blade that extends at right angles to the conveyer belt and is pressed against the conveyer belt.

BACKGROUND OF THE INVENTION

Stripping devices of this type are known, in which the stripping arms are designed as torsional spring arms and for this purpose are fastened on the holding brackets by means of torsional rubber joints. The pre-tension and consequently the pressing force of the scraping blades is set by rotating and locking the bearing axis with the holding brackets arranged thereon and with the torsional elements held by it by means of clamps. The torsional elements must be clamped with a defined screw pre-tension, and they are liable to unintended changes in setting. This often results in insufficient pressing force and insufficient cleaning effect. Furthermore, the torsional force is only proportional to the rotation rather than progressive. All this can also lead to increased wear on the scraping blade. This situation is remedied by the present invention.

SUMMARY OF THE INVENTION

The basic task of the present invention is a stripping device for cleaning conveyer belts of the class described in the introduction, in which the stripping arms are mounted such that and optimal cleaning effect that is gentle on the belt, simple in installation, as well as minimal scraping blade wear is achieved.

This task is accomplished by the present invention with a stripping device of this class by arranging a pivot axis above and parallel to the bearing axis for the respective stripping arm and supporting the stripping arm elastically against the bearing axis or holding bracket. The consequence of these measures according to the present invention is, on one hand, that no torsional rubber joints are used, and, on the other hand, that the torsion axis and now also the pivot axis of the stripping arm are separated from its elastic support. As a result, the stripping arm is able to absorb even high stresses without problems, without the risk of change in setting. The elastic support based on compression, which is realized in the stripping device according to the present invention, is subject, at most, to minimum wear, and is also uncomplicated and can be easily replaced.

Further essential characteristics of the present invention will be listed below. According to the present invention, the respective holding bracket has bearing cheeks on both sides for mounting a pivot axle concentric with the pivot axis. The pivot axis is mounted preferably nonrotatably in the bearing cheeks, and the stripping arm is mounted in a torsionally elastic manner on the pivot axis. The nonrotatable mounting of the pivot axis can be achieved by welding, but also by means of detachable clamps or cotter pins. Furthermore, it is suggested according to the present invention that the stripping arm should have a claw at least partially surrounding the pivot axis, and that this claw should be subject to tensile stress when the stripper is in its working position, and consequently it should not be able to spontaneously separate from the pivot axis if, e.g., the conveyer belt should happen to travel in the backward direction. According to another recommendation of the present invention, another contribution is made to this by the circumstance that the claw surrounds the pivot axis in a form-locking manner and can be separated from the pivot axis only after the stripping arm has been turned out of its working position. To achieve this the separation, the pivot axis can have, e.g., a flattened zone, and the claw can have a transverse opening whose width is smaller than the diameter of the pivot axis, but slightly larger than the pivot axis in the area of its flattened zone.

According to a further embodiment of the present invention, it is provided that on its lower side, the stripping arm has a spring member, which is supported against the holding bracket and is made from an elastically deformable plastic or rubber or is designed as a rubber/metal member. This spring member acts by the compression, which results from the stripping forces acting on the scraping blade. According to the present invention, the spring member is mounted detachably on the stripper by means of a screw connection, and consequently interchangeably and adjustably in height, on a bearing plate arranged in parallel to the associated leg of the angular holding bracket. Height-adjustable fastening means that the spring member is adjustable in the direction of its principal axis, and as a result, the distance between the stripper and the holding bracket is variable, so that the angle of attack of the stripping arm or of the scraping blade carried by it against the respective conveyer belt is adjustable. According to the present invention, the spring member is designed as a rotationally symmetrical parabolic body, whose apex stands on the associated leg of the holding bracket, so that a progressive spring characteristic is guaranteed. Advantageously, the stripping arm and its claw may consist of an elastic material, so that the claw can be clamped onto the pivot axis. In this case, the scraping blade holder now preferably has a snap-in groove for the scraping blade, and the scraping blade can be pressed into the snap-in groove with snap action and secured against transverse displacement, e.g., by means of snap-in cams.

It is an object of the invention to provide a stripping device for cleaning conveyer belts whose stripping arms are mounted with sufficient elasticity, on one hand, and with a pivot axis separated from its elastic support, on the other hand, such that the scraping blades are always pressed against the lower strand of the conveyer belt to be cleaned such that the cleaning effect obtained is optimal and gentle for the belt and causes only minimal wear on the scraping blade, and that the scraping blades can be easily replaced.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 2 shows a top view of the stripping arm and its mounting according to FIG. 1;

FIG. 3 is a view of the object according to FIG. 2 in the direction of arrow A;

Figure 1:
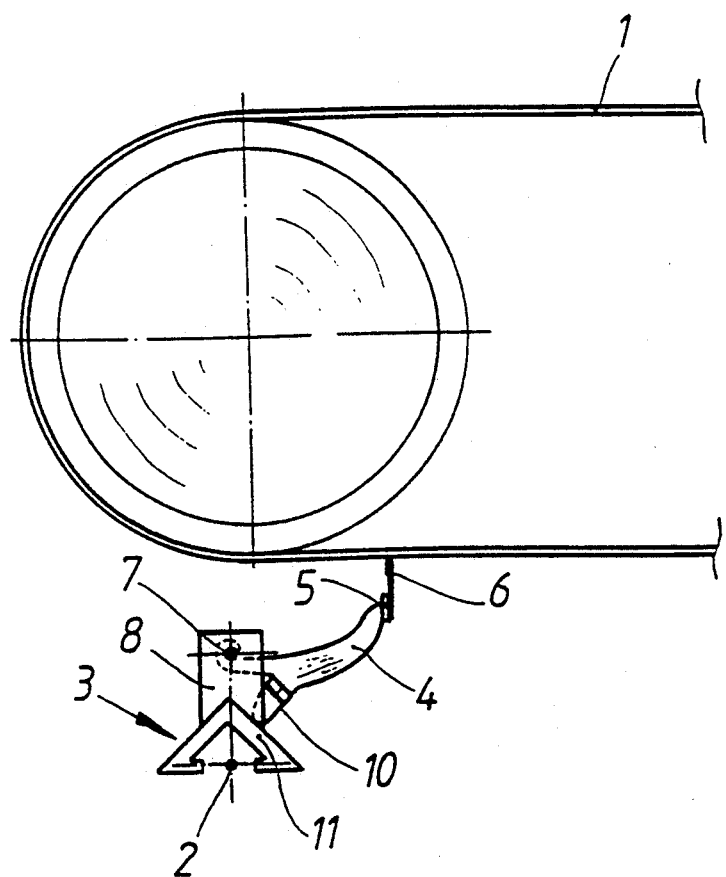
FIG. 1 is a front view of a stripping device according to the present invention showing the stripping device with a tail pulley and conveyer belt.
Figure 5:
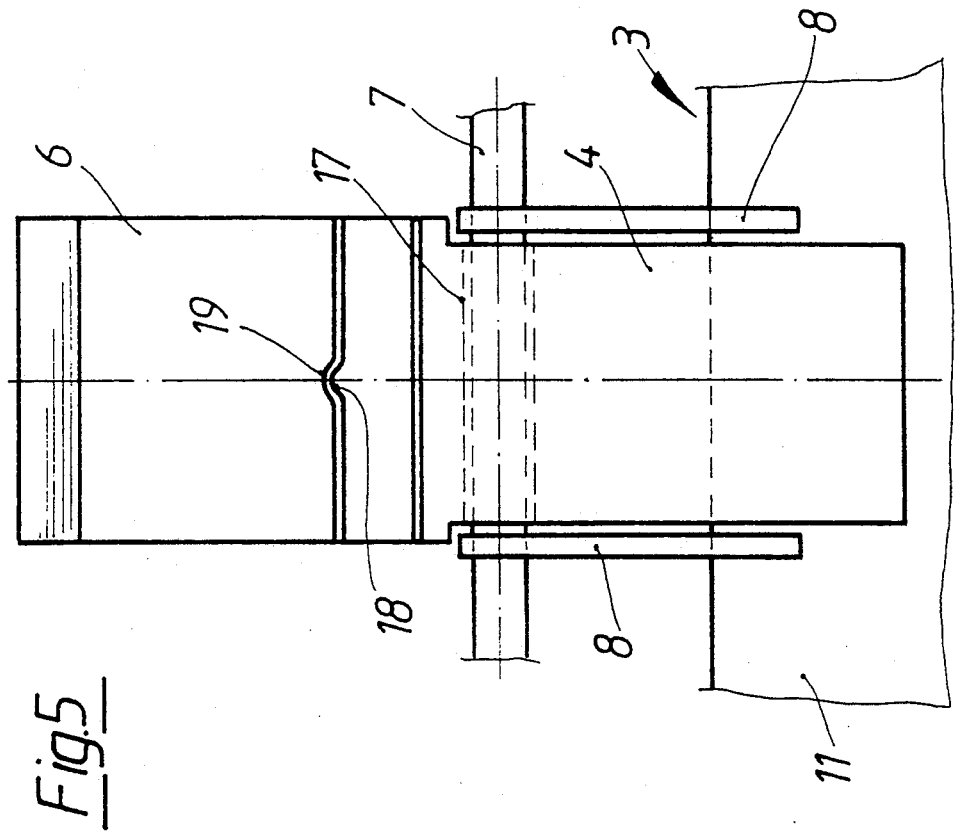
FIG. 5 is a right side view of the stripping device according to FIG. 4.
Figure 4:
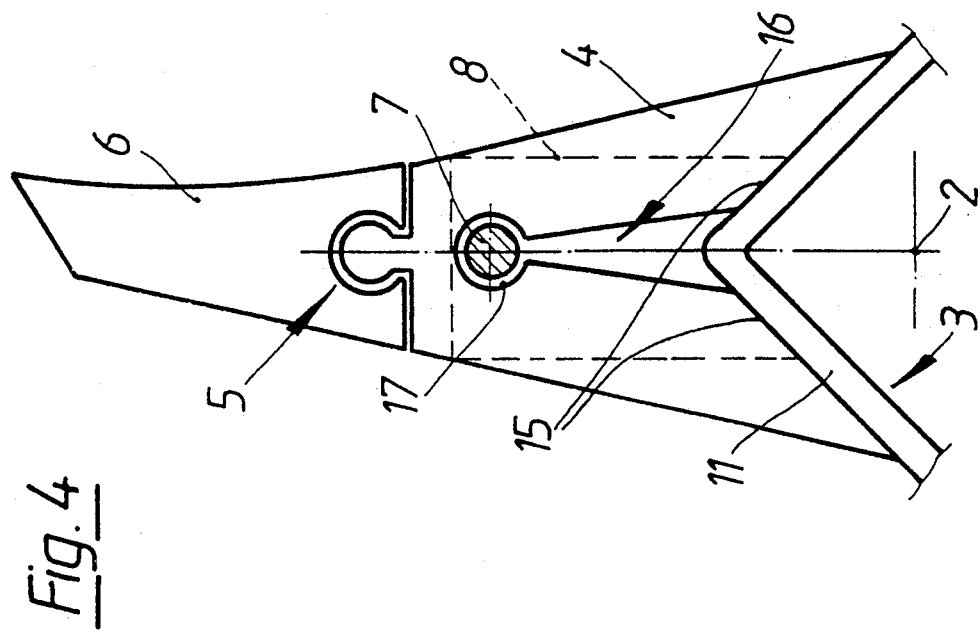
FIG. 4 is a front view of another embodiment of the invention.

The figures show a stripping device for cleaning conveyer belts 1. In its basic design, this stripping device has a bearing axis 2 arranged under the respective conveyer belt 1 along the width of the belt. Stripping arms 4 that can be mounted on the bearing arms by means of roof ridge-like holding brackets 3, with scraping blade holders 5 arranged at the ends of stripping arms 4 for a scraping blade 6 that extends at right angles to the conveyer belt 1 and is pressed against the conveyer belt. A pivot axis 7 for the respective stripping arm 4 is arranged above and parallel to the bearing axis 2. The stripping arm 4 is supported elastically against the bearing axis 2 or, according to the present embodiment, against its holding bracket 3. The respective holding bracket 3 has bearing cheeks 8 for a pivot axle 7a mounted in the bearing cheeks 8. The pivot axis 7 is mounted nonrotatably in the bearing cheeks 8. Due to its elastic support, the stripping arm 4 is mounted on the pivot axis 7 in a torsionally elastic manner. The stripping arm 4 has a claw 9, which surrounds the pivot axis 7 at least partially and is subject to tensile stress when the stripping arm 4 is in its working position. The claw 9 surrounds the pivot axis 7 in a form-locking manner, and, together with the stripping arm 4, the claw can be separated or detached from said pivot axis 7 only after the stripping arm 4 has been turned out of its working position. On its lower side, the stripping arm 4 has a spring member 10, which is supported against the holding bracket 3 and made of an elastic plastic or rubber, and it may also be designed as a rubber/metal member. The spring member 10 is fastened on the stripper 4 detachably or adjustably in height on its bearing plate 12 arranged in parallel to the associated leg 11 of the angular or roof ridge-like holding bracket 3 by means of a screw connection or a central screw bolt 13. Said spring member 10 is designed as a rotationally symmetrical parabolic body, whose apex stands on the associated leg 11 of the holding bracket 3. Symmetrical stress on said spring member 10 in the direction of its principal axis is thus achieved.

The stripping arm 4 and its claw 9 may consist of an elastic material. In this case, the claw 9 can be clamped onto the pivot axis 7. The scraping blade holder 5 has a snap-in groove 14 for the scraping blade 6. The scraping blade 6 can be pressed into the snap-in groove 14 by snap action and secured against transverse displacement.

The stripping arm 4 consists, according to another embodiment, of an elastic material, it is clamped onto the pivot axis 7, and is supported torsionally elastically on the bearing axis 2 or the holding bracket 3. The stripping arm 4 is preferably designed as a truncated wedge and, forming roof ridge-like support surfaces 15, it has a conically tapering insertion slot 16 with a bearing opening 17 joining it at the end for the pivot axis 7. The scraping blade 6 can be placed on the truncated wedge and can be held by means of a tongue-and-groove combination serving as a scraping blade holder 5 in a form-locking and non-positive manner. The tongue-and-groove combination may have a central elevation 18 and a matching depression 19 for security against lateral displacement of the scraping blade 6.

While specific embodiments of the invention have been shown and described in detail to illustrate the application of the principles of the invention, it will be understood that the invention may be embodied otherwise without departing from such principles.

What is claimed is:

1. A stripping device for cleaning a conveyor belt, the device comprising:

a bearing having a bearing axis;

a holding bracket mounted on said bearing;

a pivot axle positioned between said holding bracket and the conveyor belt, said pivot axle being mounted to said holding bracket;

a stripping arm having a claw means, said claw means having an open end portion substantially equal to or greater than a diameter of said pivot axle, said claw means for surrounding said pivot axle in a positive-locking manner when said stripping arm is in a working position, and said claw means for slideably disengaging said pivot axle when said stripping arm is turned out of a working position; and, a spring member being mounted between said stripping arm and said holding bracket for biasing said stripping arm against said holding bracket.

2. A stripping device according to claim 1 wherein said holding bracket includes two spaced apart bearing cheeks projecting upwardly from said holding bracket, a pivot axle being concentric with said pivot axis and being mounted nonrotatably between said bearing cheeks.

3. A stripping device according to claim 2 wherein said stripping arm is mounted torsionally elastically on said pivot axle.

4. A stripping device according to claim 2 where, said claw means is subject to tensile stress when said stripping arm is in said working position.

5. A stripping device according to claim 1 wherein said spring member is an elastic plastic member.

6. A stripping device according to claim 1 wherein said spring member is a rubber member.

7. A stripping device according to claim 1 wherein said spring member is a rubber/metal member.

8. A stripping device according to claim 1 wherein the spring member is detachably mounted to said stripping arm and being adjustable in height by a screw connection means.

9. A stripping device according to claim 1 wherein said spring member is a parabolic body, said parabolic body having an apex area, said holding bracket having a bearing surface, said apex area bearing on said bearing surface.

10. A stripping device according to claim 1 wherein said scraping arm has a second end having a scraping blade holder, a scraping blade being removably connected to said scraping blade holder by a snapping means, said scraping blade being secured in said scraping blade holder against transverse displacement.

11. A device in accordance with claim 1, wherein:

said claw means and said spring member are positioned on said stripping arm and said holding bracket in a manner which applies tensile force to said claw means when said stripping arm is biased against the conveyor belt.

12. A stripping device for cleaning a conveyor belt, the device comprising:
a bearing axis;
a holding bracket mounted on said bearing axis;
a pivot axle between said holding bracket and the conveyor belt, said pivot axle mounted to said holding bracket; and a stripping arm having an elastic section biasing said stripping arm against the conveyor belt, said stripping arm being clamped onto said pivot axle and supported on said holding bracket in a torsionally rotary elastic manner, wherein: said stripping arm is a claw means, said claw means having an open end portion substantially equal to or greater than a diameter of said pivot axle for surrounding said pivot axle in a positive-locking manner in a working position of said stripping arm, and for slideably disengaging said pivot axle when turned out of a working position.

13. A stripping device according to claim 12 wherein said claw is made of an elastic material, said claw being clampable onto said pivot axle.

14. A stripping device according to claim 12 wherein said stripping arm is designed as a truncated wedge and has a conically tapering insertion slot, said stripping arm insertion slot being fittable over said pivot axle.

15. A device in accordance with claim 14, further comprising: a scraping blade attached to said truncated wedge by a tongue-and-groove combination.

16. A device in accordance with claim 15, wherein: said tongue-and-groove combination has a central elevation to secure the scraping blade against transverse displacement.

17. A stripping device for cleaning conveyor belts comprising:
a holding bracket having a bearing axis, said holding bracket being supported at said bearing axis;
a stripping arm pivotably connected to said holding bracket for pivotal movement about a pivot axis, said pivot axis being arranged above said bearing axis, said stripping arm having a lower side;
a spring member mounted on said stripping arm lower side, said spring member being supported against said holding bracket, detachably mounted to said stripping arm, a screw connection means having a bearing plate connected to said stripping arm and having a threaded bolt being threadably connected to said bearing plate for adjusting height of said stripping arm.

* * * * *